(12) United States Patent
Keon

(10) Patent No.: US 7,069,048 B2
(45) Date of Patent: Jun. 27, 2006

(54) BASE STATION SYSTEM SUPPORTING MULTI-SECTOR/MULTI-FREQUENCY ASSIGNMENT FOR SEAMLESS CALL SERVICE

(75) Inventor: Seong-Joon Keon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 385 days.

(21) Appl. No.: 10/241,241

(22) Filed: Sep. 11, 2002

(65) Prior Publication Data

US 2003/0073422 A1 Apr. 17, 2003

(30) Foreign Application Priority Data

Sep. 11, 2001 (KR) .............................. 2001-55840
Dec. 29, 2001 (KR) .............................. 2001-88389

(51) Int. Cl.
*H04B 3/36* (2006.01)
*H04B 7/14* (2006.01)

(52) U.S. Cl. ............................ 455/561; 455/8; 455/22; 455/123; 455/423

(58) Field of Classification Search ................ 455/424, 455/507, 561, 562.1, 67.11, 509, 8, 9, 445, 455/115.1, 132, 22, 423
See application file for complete search history.

(56) References Cited

U.S. PATENT DOCUMENTS

| | | | |
|---|---|---|---|
| 5,666,646 A * | 9/1997 | McCollum et al. ............ | 455/8 |
| 5,854,813 A | 12/1998 | Rottinghaus et al. | |
| 5,861,844 A * | 1/1999 | Gilmore et al. ............. | 342/374 |
| 5,878,330 A * | 3/1999 | Naumann ..................... | 455/71 |
| 6,009,130 A * | 12/1999 | Lurey et al. ................ | 375/347 |
| 6,018,644 A * | 1/2000 | Minarik ....................... | 455/82 |
| 6,161,024 A * | 12/2000 | Komara ................... | 455/562.1 |
| 6,363,262 B1 * | 3/2002 | McNicol ..................... | 455/561 |
| 6,535,721 B1 * | 3/2003 | Burke et al. ................ | 455/137 |
| 6,687,514 B1 * | 2/2004 | Dauerer et al. ............. | 455/561 |
| 6,778,590 B1 * | 8/2004 | Choi et al. .................. | 375/145 |
| 6,813,253 B1 * | 11/2004 | Yamaguchi ................. | 370/330 |
| 2001/0051512 A1 * | 12/2001 | Wilson et al. .............. | 455/132 |
| 2003/0001668 A1 * | 1/2003 | Mruz et al. .................... | 330/51 |
| 2003/0073422 A1 * | 4/2003 | Keon .......................... | 455/323 |

FOREIGN PATENT DOCUMENTS

DE 197 55 379 6/1999

OTHER PUBLICATIONS

European Search Report dated Nov. 15, 2002, issued in a counterpart application, namely Appln. No. 02020439.2.
"N+M Radio Sector Flexible Redundancy for Point-to-Multipoint Systems", No. 421, May 1999, pp. 658-659.

* cited by examiner

*Primary Examiner*—Simon Nguyen
(74) *Attorney, Agent, or Firm*—Dilworth & Barrese LLP

(57) ABSTRACT

A base station system supporting multi-sector/multi-FA in which, when a board goes out of order, a redundant board is automatically switched on, so as to prevent the call from being cut off and the entire capacity of the system from being influenced, thereby enabling the system to maintain normal operation and to be perfectly managed. In the base station system, signal transmitting and receiving paths of up- and down-converters are separated from each other, each board contains all FAs, and redundant boards are utilized, so that the system can normally operate in soft/hard-redundancy modes without cut-off of the call, even when a problem occurs in the paths.

13 Claims, 6 Drawing Sheets

BASE STATION SYSTEM SUPPORTING MULTI-SECTOR/MULTI-FREQUENCY ASSIGNMENT FOR SEAMLESS CALL SERVICE

PRIORITY

This application claims priority to applications entitled "Base Station System Supporting Multi-Sector/multi-FA For Seamless Call Service" filed in the Korean Industrial Property Office on Sep. 11, 2001 and Dec. 29, 2001, and assigned Serial Nos. 2001-55840 and 2001-88389, respectively. The contents of these applications are hereby incorporated by reference.

BACKGROUND OF THE INVENTION

1. Field of the Invention

The present invention relates to a base station of a mobile communication system, and more particularly to a base station system supporting multi-sector/multi-frequency assignment.

2. Description of the Related Art

In general, a base station of a mobile communication system such as a Universal Mobile Telecommunication System (UMTS) has a construction capable of supporting multi-sector and multi-frequency assignment (hereinafter, referred to as FA), so as to increase a user capacity and efficiently utilize the frequency.

FIG. 1 is a block diagram illustrating a construction of a conventional base station system of a mobile communication system, which can support multi-sector/multi-FA and provide an antenna diversity effect. In this case, it is assumed that the base station system supports six sectors/four FAs, although FIG. 1 shows only one sector and four FAs supported by the base station system, for convenience of description.

Referring to FIG. 1, a signal received by a first receiving antenna Rx Ant. 1 is band pass-filtered by a band pass filter (BPF) 11. A low noise amplifier (LNA) 13 amplifies the signal which has been band pass-filtered by the band pass filter 11. A divider 15 divides the signal amplified by the low noise amplifier 13 into signals for each of the four FAs. That is, the signals divided by the divider 15 are applied to an up/down-converter board 21 for FA1, an up/down-converter board 22 for FA2, an up/down-converter board 23 for FA3, and an up/down-converter board 24 for FA4, respectively.

A signal received by a second receiving antenna Rx Ant. 2 is band pass-filtered by a band pass filter 12. A low noise amplifier 14 amplifies the signal which has been band pass-filtered by the band pass filter 12. A divider 16 divides the signal amplified by the low noise amplifier 14 into signals for each of the four FAs. That is, the signals divided by the divider 16 are applied to an up/down-converter board 21 for FA1, an up/down-converter board 22 for FA2, an up/down-converter board 23 for FA3, and an up/down-converter board 24 for FA4, respectively.

The four up/down-converter boards 21 to 24 for the four FAs constitute an up/down-converter 20. Each board includes first down-converters 21a, 22a, 23a, and 24a for downwardly converting frequencies of signals processed after being received through the first receiving antenna Rx Ant. 1, second down-converters 21b, 22b, 23b, and 24b for downwardly converting frequencies of signals processed after being received through the second receiving antenna Rx Ant. 2, and up-converters 21c, 22c, 23c, and 24c for upwardly converting frequencies of signals to be transmitted.

A combiner 31 receives and combines the four signals with the upwardly-converted frequencies from the four up/down-converter boards 21 to 24 of the up/down-converter 20, and outputs the combined signal. A divider 32 divides again the signal combined by the combiner 31 into four signals, which can be inputted to four power amplifiers (PA) 33 to 36. The four power amplifiers 33 to 36 correspond to the four FAs, respectively. A combiner 37 combines the four signals from the power amplifiers 33 to 36 and outputs a combined signal. The band pass filter 38 band pass-filters the combined signal and outputs it through a transmission antenna Tx Ant.

In the base station system as illustrated in FIG. 1 (which is called "Node B" in the UMTS), the power amplifiers 33 to 36 and the four up/down-converter boards 21 to 24 are elements which require automatic switching when the boards are abnormal. The base station system having the construction described above employs a hard-redundancy mode, utilizing extra boards when it has a small number of sectors and FAs. When the base station has an increased number of sectors and FAs, only the power amplifier employs a soft-redundancy mode utilizing load sharing, due to the problem of the number of the boards. In this case, when one of the four up/down-converter boards 21 to 24 is out of order, an FA of a sector corresponding to the out-of-order board cannot be used. That is, in the conventional base station system, one FA becomes useless when a board is out of order, since transmitting and receiving paths according to the FAs are formed in one up/down converter.

In the conventional base station system as described above, although each board independently operates in order to support the multi-sector/multi-FA, when one of the boards is out of order, the call is cut off, thereby having a detrimental effect on the entire capacity of the system.

SUMMARY OF THE INVENTION

Accordingly, the present invention has been designed to solve the above-mentioned problems occurring in the prior art, and one object of the present invention is to provide signal-transmitting/receiving systems, which prevent a call from being cut off even when any one board goes out of order in a base station system supporting multi-sector/multi-FA.

It is another object of the present invention to provide signal-transmitting/receiving systems, which prevent an entire capacity of a system from being influenced by any one board, which has gone out of order in a base station system supporting multi-sector/multi-FA.

In order to accomplish the above and other objects, there is provided a base station system supporting multi-sector/multi-FA according to the present invention, in which when a board goes out of order, a redundant board is automatically switched on, so as to prevent a call from being cut off and an entire capacity of the system from being influenced, thereby enabling the system to maintain normal operation and to be perfectly managed. In the base station system according to the present invention, signal transmitting and receiving paths of up- and down-converters are separated from each other, each board contains all FAs, and redundant boards are utilized, so that the system can normally operate in soft/hard-redundancy modes without cut-off of the call, even when any problem occurs in the paths.

A signal-receiving system according to the present invention comprises at least one signal-receiving section. In the signal-receiving system, a down-converter includes at least one down-converter board and at least one redundant down-converter board. One board selected from among the at least one down-converter board and the at least one redundant down-converter board downwardly converts a frequency of a signal inputted through the signal-receiving section, the down-converter board corresponding to the signal-receiving section. A switching section is connected between the signal-receiving section and the down-converter. The switching section is switched to connect the at least one down-converter board with the signal-receiving section when the at least one down-converter board is normal, and as to connect the at least one redundant down-converter board with the signal-receiving section when the at least one down-converter board is abnormal.

A signal-transmitting system according to the present invention comprises an up-converter. The up-converter includes at least one up-converter board and at least one redundant up-converter board. One board selected from among the at least one up-converter board and the at least one redundant up-converter board and downwardly converts a frequency of a transmitting signal which is to be transmitted. A switching section is switched to supply said transmitting signal to the at least one up-converter board when the at least one up-converter board is normal, and as to supply said transmitting signal to the at least one redundant up-converter board when the at least one up-converter board is abnormal.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described herein below with reference to the accompanying drawings. In the following description of the present invention, a detailed description of known functions and configurations incorporated herein will be omitted when it may make the subject matter of the present invention rather unclear.

Figure 2:
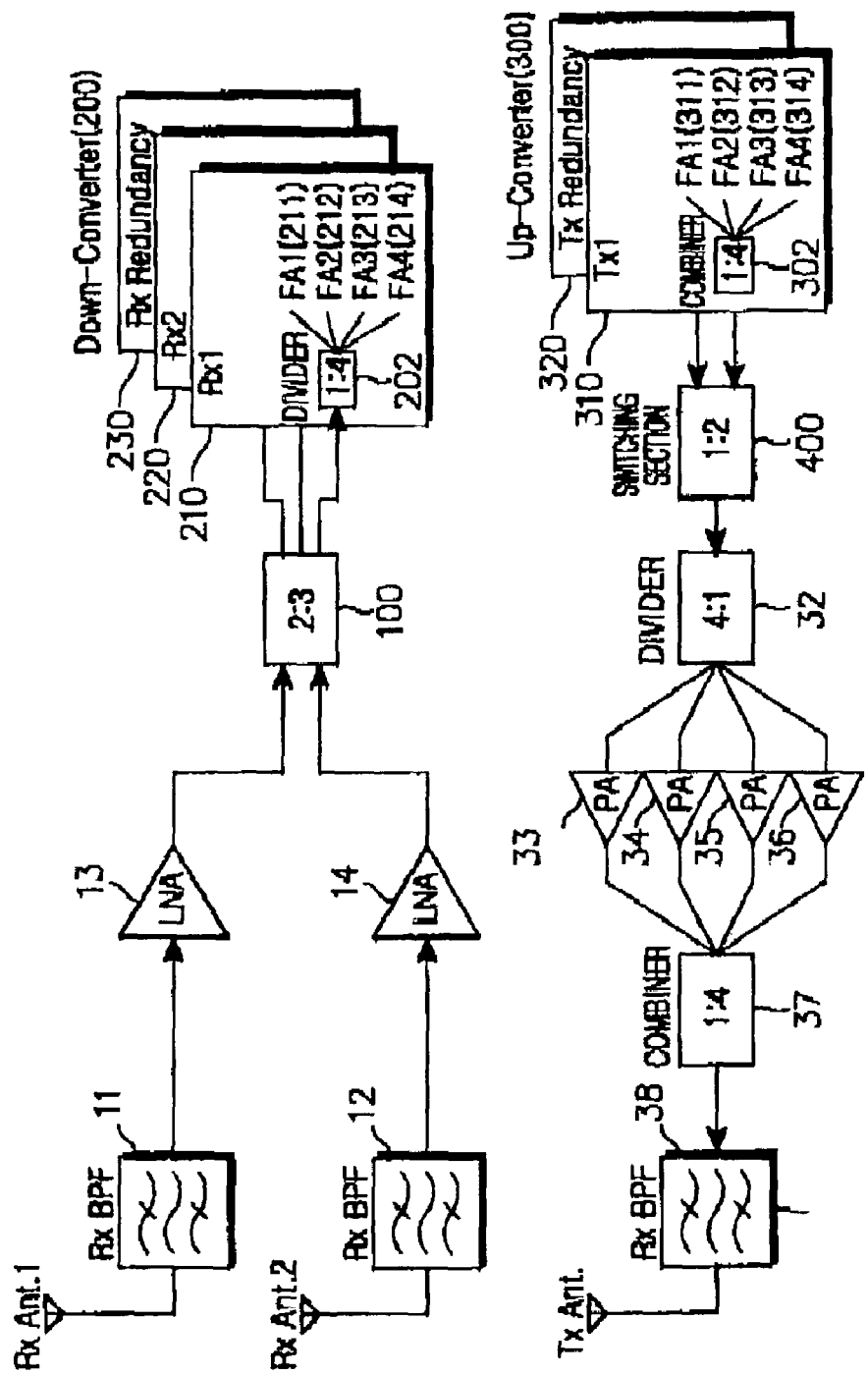
FIG. 2 is a block diagram illustrating a construction of a base station system of a mobile communication system according to a preferred embodiment of the present invention.

FIG. 2 is a block diagram illustrating a construction of a base station system of a mobile communication system according to a preferred embodiment of the present invention, which can support multi-sector/multi-FA and provide an antenna diversity effect. Although FIG. 2 illustrates only one sector supported by the base station system for convenience of description, the base station system supports six sectors/four FAs, and each sector includes four FAs, each of which forms two receiving paths and one transmitting path so as to obtain an antenna diversity effect. In each of the transmitting and receiving paths, in order to enable the paths to operate normally even when one of the boards operates abnormally, power amplifiers employ a soft-redundancy mode while up/down-converter boards employ a hard-redundancy mode.

First, a construction of a receiving path according to a preferred embodiment of the present invention will be described hereinafter with reference to FIG. 2.

A signal received by a first receiving antenna Rx Ant. 1 is band pass-filtered by a band pass filter 11. A low noise amplifier (LNA) 13 amplifies the signal which has been band pass-filtered by the band pass filter 11. A signal received by a second receiving antenna Rx Ant. 2 is band pass-filtered by a band pass filter 12. A low noise amplifier 14 amplifies the signal which has been band pass-filtered by the band pass filter 12. The first receiving antenna Rx Ant. 1, the band pass filter 11, and the low noise amplifier 13 constitute a first signal-receiving section, and the second receiving antenna Rx Ant. 2, the band pass filter 12, and the low noise amplifier 14 constitute a second signal-receiving section.

A switching section 100 is connected between a down-converter 200 and the low noise amplifiers 13 and 14. The switching section 100 receives a signal from the LNA 13, which is transmitted through the first receiving path or the first signal-receiving section, and a signal from the LNA 14, which is transmitted through the second receiving path or the second signal-receiving section.

The down-converter 200 includes down-converter boards 210, 220, and 230, the number of which is one more than that of the receiving paths. The down-converter board 210 corresponds to the first receiving path Rx1, the down-converter board 220 corresponds to the second receiving path Rx2, and the down-converter board 230 is a redundancy board. Each of the down-converter boards 210, 220, and 230 includes one divider and four converters for performing downward conversion for four FAs. For example, the down-converter 210 includes one divider 202 and four converters 211 to 214 for four FAs.

That is, the switching section 100 receives the signals transmitted through the first and second receiving paths, and outputs the received signals to the boards of the down-converter 200 corresponding to the first and second receiving paths, respectively. During normal operation, the switching section 100 outputs the signal from the LNA 13, which is transmitted through the first receiving path, to the down-converter board 210, while outputting the signal from the LNA 14, which is transmitted through the second receiving path, to the down-converter board 220. However, when one of the down-converter boards is out of order (abnormal), the corresponding signal is transmitted to the redundant down-converter board 230 instead of the out-of-order board.

Next, a construction of a transmitting path according to a preferred embodiment of the present invention will be described hereinafter with reference to FIG. 2.

An up-converter 300 includes one up-converter board 310 and one redundant up-converter board 320. When the up-converter board 310 is out of order, the redundant up-converter board 320 takes the place of the up-converter board 310, thereby enabling the up-converter to continue normal operation. Each of the up-converter boards includes four converters for upwardly converting frequencies of signals, and one 4:1 combiner for combining output signals from the four converters and outputting the combined signal. For example, the up-converter board 310 includes four converters 311 to 314 and one 4:1 combiner 302.

A switching section 400 operates as a switch and is connected between the up-converter boards 310 and 320 and a divider 32. In a normally operating state, the switching section 400 is so switched as to output a signal transmitted from the up-converter board 310 to the divider 32. In contrast, when the up-converter board 310 is out of order, the switching section 400 is so switched as to output a signal transmitted from the up-converter board 320 to the divider 32.

The divider 32 divides the signal from the switching section 400 into four signals, so that the four signals can be inputted to four power amplifiers 33 to 36, respectively. The power amplifiers 33 to 36 correspond to the four FAs, respectively. The combiner 37 combines signals outputted from the power amplifiers 33 to 36, and outputs a combined signal. A band pass filter 38 band pass-filters the signal combined by the combiner 37 and outputs it through a transmitting antenna Tx Ant.

Figure 3:
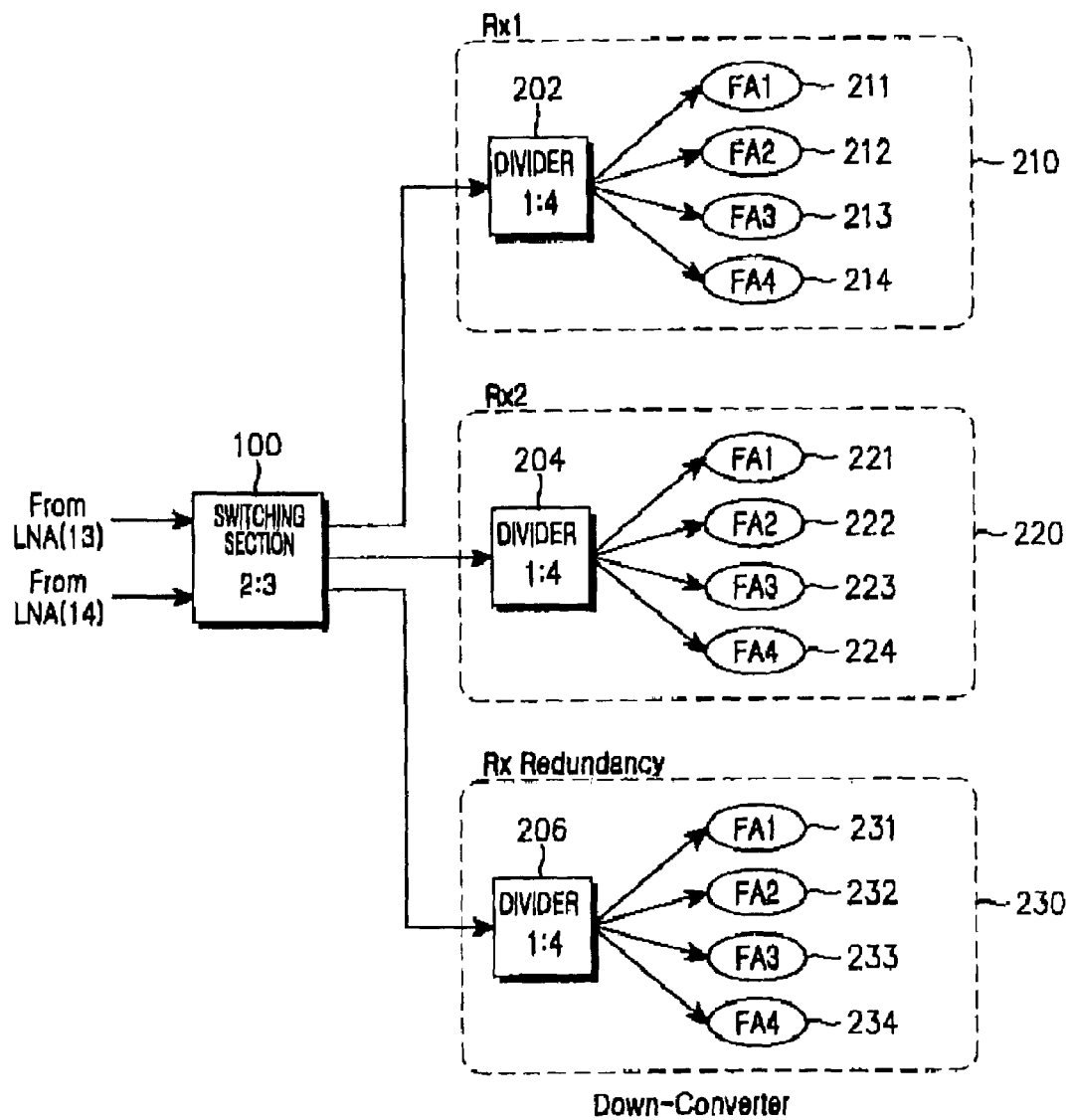
FIG. 3 is a block diagram illustrating the construction of the down-converter illustrated in FIG. 2 in more detail.

FIG. 3 is a block diagram illustrating a construction of the down-converter 200 illustrated in FIG. 2 in more detail. Referring to FIG. 3, the down-converter 200 includes a first down-converter board 210, a second down-converter board 220, and a third or redundant down-converter board 230. The switching section 100 is connected between the LNAs 13 and 14 and the down-converter boards 210, 220, and 230. The switching section 100 is switched to supply a signal received from the LNA 13 to the first down-converter board 210 or the redundant down-converter board 230, and to supply a signal received from the LNA 14 to the second down-converter board 220 or the redundant down-converter board 230. The construction and operation of the switching section 100 will be described later in more detail with reference to FIG. 5.

The first down-converter board 210 includes a divider 202 and four converters 211 to 214. The divider 202 divides a signal from the switching section 100 into four signals respectively for four FAs, and outputs the four signals. The first converter 211 is arranged for FA1 and downwardly converts a frequency of a signal from the divider 202. The second converter 212 is arranged for FA2 and downwardly converts a frequency of a signal from the divider 202. The third converter 213 is arranged for FA3 and downwardly converts a frequency of a signal from the divider 202. The fourth converter 214 is arranged for FA4 and downwardly converts a frequency of a signal from the divider 202.

The second down-converter board 220 includes a divider 204 and four converters 221 to 224. As in divider 202, divider 204 divides a signal from the switching section 100 into four signals respectively for four FAs, and outputs the four signals. Again, the first converter 221 is arranged for FA1 and downwardly converts a frequency of a signal from the divider 204, the second converter 222 is arranged for FA2 and downwardly converts a frequency of a signal from the divider 204, the third converter 223 is arranged for FA3 and downwardly converts a frequency of a signal from the divider 204, and the fourth converter 224 is arranged for FA4 and downwardly converts a frequency of a signal from the divider 204.

The third (or redundant) down-converter board 230 includes a divider 206 and four converters 231 to 234, and operates in the same manner as the first and second down-converters 210 and 220, described above.

Figure 4:
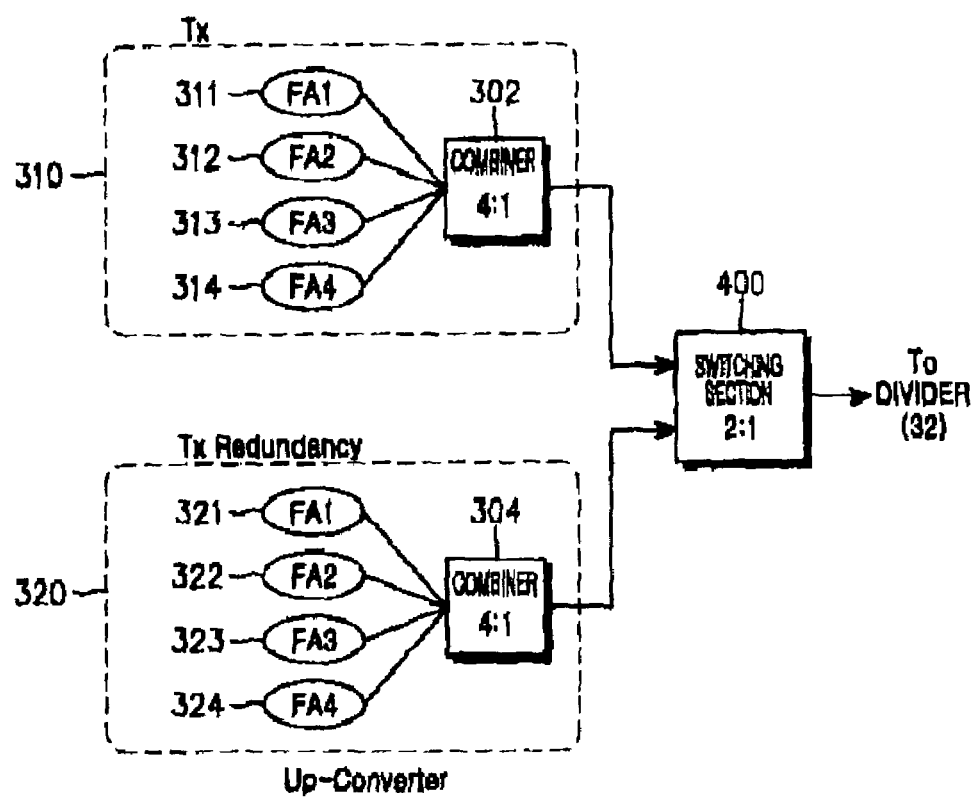
FIG. 4 is a block diagram illustrating the construction of the up-converter illustrated in FIG. 2 in more detail.

FIG. 4 is a block diagram illustrating a construction of the up-converter 300 illustrated in FIG. 2 in more detail. Referring to FIG. 4, the up-converter 300 includes an up-converter board 310 and a redundant up-converter board 320. The switching section 400 is connected between the up-converter boards 310 and 320 and the divider 32. The switching section 400 is switched to supply a signal that has been upwardly converted by one of the up-converter boards 310 and 320 to the divider 32. When the up-converter 310 normally operates, the switching section 400 is switched to supply the signal from the up-converter board 310 to the divider 32. When the up-converter board 310 does not normally operate, the switching section 400 is switched to supply the signal from the redundant up-converter board 320 to the divider 32. The construction and operation of the switching section 400 will be described later in more detail with reference to FIG. 6.

The up-converter board 310 includes converters 311 to 314 for upwardly converting transmission signals for four FAs, respectively, and a combiner 302 for combining output signals of the converters 311 to 314 and outputting a combined signal. The converter 311 is arranged for upwardly converting a transmitting signal for FA1, the converter 312 is arranged for upwardly converting a transmitting signal for FA2, the converter 313 is arranged for upwardly converting a transmitting signal for FA3, and the converter 314 is arranged for upwardly converting a transmitting signal for FA4.

The redundant up-converter board 320 includes converters 321 to 324 for upwardly converting transmission signals for four FAs, respectively, and a combiner 304 for combining output signals of the converters 321 to 324 and outputting a combined signal. The converter 321 is arranged for upwardly converting a transmitting signal for FA1, the converter 322 is arranged for upwardly converting a transmitting signal for FA2, the converter 323 is arranged for upwardly converting a transmitting signal for FA3, and the converter 324 is arranged for upwardly converting a transmitting signal for FA4.

Figure 5:
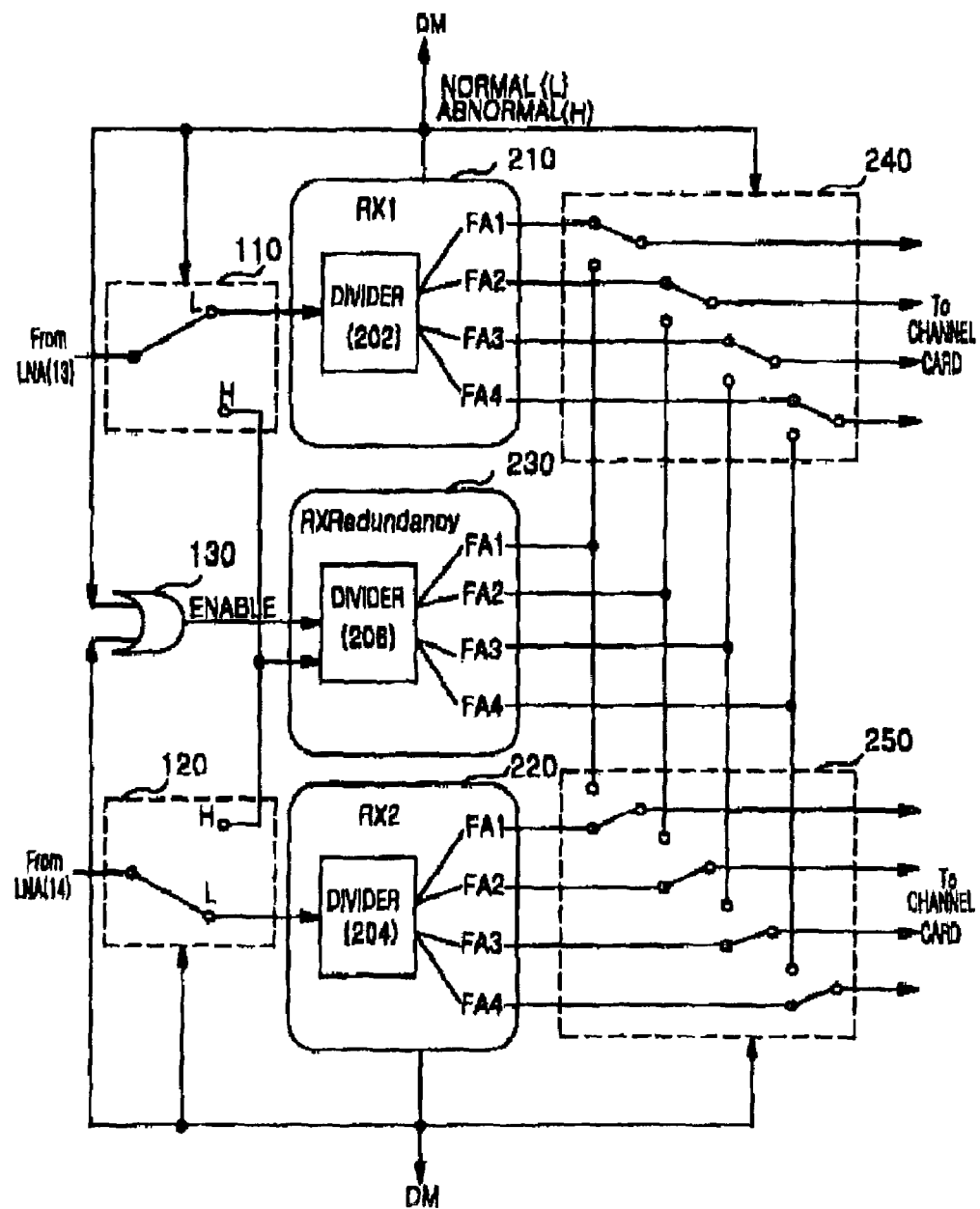
FIG. 5 is a diagram illustrating in more detail the switching control operation on the receiving paths of the base station system according to the preferred embodiment of the present invention.

FIG. 5 is a diagram illustrating in more detail the switching control operation on the receiving paths of the base station system according to the preferred embodiment of the present invention. Referring to FIG. 5, a first switch 110, a second switch 120, and an OR gate 130 are elements constituting the switching section 100. The switches 110 and 120 are Single-Pole Double-Throw (SPDT) switches, each of which has one input terminal and two output terminals. An input terminal of the first switch 110 is connected with an output terminal of the LNA 13. A first output terminal L of the first switch 110 is connected with an input terminal of the divider 202, which is an input terminal of the down-converter board 210. A second output terminal H of the first switch 110 is connected with an input terminal of the divider 206, which is an input terminal of the redundant down-converter board 230. A first output terminal L of the second switch 120 is connected with an input terminal of the divider 204, which is an input terminal of the down-converter board 220. A second output terminal H of the second switch 120 is connected with an input terminal of the divider 206, which is an input terminal of the redundant down-converter board 230.

The operations of the first and second switches 110 and 120 are controlled by diagnostic monitoring (DM) signals for the down-converter boards 210 and 220, respectively. The DM signal is a signal for diagnosing the state of each board, and has different levels according to whether a corresponding board is normal or abnormal. As an example of generating a DM signal for each board and performing a process according to the generated DM signal, lighting of light-emitting diodes provided at a front panel of the base station system may be controlled according to DM signals generated from corresponding boards. Such generation of and process according to the generation of a DM signal is well known to those related in the art, so detailed description about that will be omitted here.

In response to a DM signal of "L" level that represents that the down-converter board 210 is normal, the input terminal and the first output terminal L of the first switch 110 are connected with each other. Then, a receiving path is formed between the LNA 13 and the down-converter board 210. In response to a DM signal of "H" level that represents that the down-converter board 210 is abnormal, the input terminal and the second output terminal H of the first switch 110 are connected with each other. Then, a receiving path is formed between the LNA 13 and the redundant down-converter board 230. In response to a DM signal of "L" level that represents that the down-converter board 220 is normal, the input terminal and the first output terminal L of the second switch 120 are connected with each other. Then, a receiving path is formed between the LNA 14 and the down-converter board 220. In response to a DM signal of "H" level that represents that the down-converter board 220 is abnormal, the input terminal and the second output terminal H of the second switch 120 are connected with each other. Then, a receiving path is formed between the LNA 14 and the redundant down-converter board 230.

The OR gate 130 includes a first input terminal, a second input terminal, and an output terminal. A DM signal for the down-converter 210 can be inputted through the first input terminal of the OR gate 130, and a DM signal for the down-converter 220 can be inputted through the second input terminal of the OR gate 130. When a DM signal of "H" level which represents that at least one of the down-converter boards 210 and 220 is abnormal is applied, the OR gate 130 outputs an enable signal of "H" level, thereby activating the redundant down-converter board 230. That is, when it is diagnosed that at least one of the down-converter boards 210 and 220 is abnormal, the OR gate 130 enables the redundant down-converter board 230 to take the place of the abnormal board.

A switching section 240 is connected between a channel card (not shown) and the down-converter board and redundant down-converter board 210 and 230, and a switching section 250 is connected between a channel card (not shown) and the down-converter board and redundant down-converter board 220 and 230. In this case, the channel card is a known element of a base station provided with a plurality of channels, which performs modulation and demodulation of signals of each channel. Therefore, a detailed description about the channel card will be omitted here.

Each of the switching sections 240 and 250 includes Double-Pole Single-Throw (DPST) switches, each of which has two input terminals and one output terminal. Input terminals of the DPST switches of the switching sections 240 and 250 are connected with output terminals of corresponding FAs of the down-converter board 210 and redundant down-converter board 230, and output terminals of the DPST switches of the switching sections 240 and 250 are connected with the channel cards. The switching operations of the DPST switches of the switching sections 240 and 250 are controlled by the DM signals for the down-converter boards 210 and 220, respectively.

In response to a DM signal of "L" level, which represents that the down-converter board 210 is normal, a first input terminal and an output terminal of each DPST switch of the switching section 240 are connected with each other. Then, a receiving path is formed between the down-converter board 210 and the channel card. In response to a DM signal of "H" level, which represents that the down-converter board 210 is abnormal, a second input terminal and the output terminal of each DPST switch of the switching section 240 are connected with each other. Then, a receiving path is formed between the redundant down-converter board 230 and the channel card. In response to a DM signal of "L" level, which represents that the down-converter board 220 is normal, a first input terminal and an output terminal of each DPST switch of the switching section 250 are connected with each other. Then, a receiving path is formed between the down-converter board 220 and the channel card. In response to a DM signal of "H" level, which represents that the down-converter board 220 is abnormal, a second input terminal and the output terminal of each DPST switch of the switching section 250 are connected with each other. Then, a receiving path is formed between the redundant down-converter board 230 and the channel card.

Figure 6:
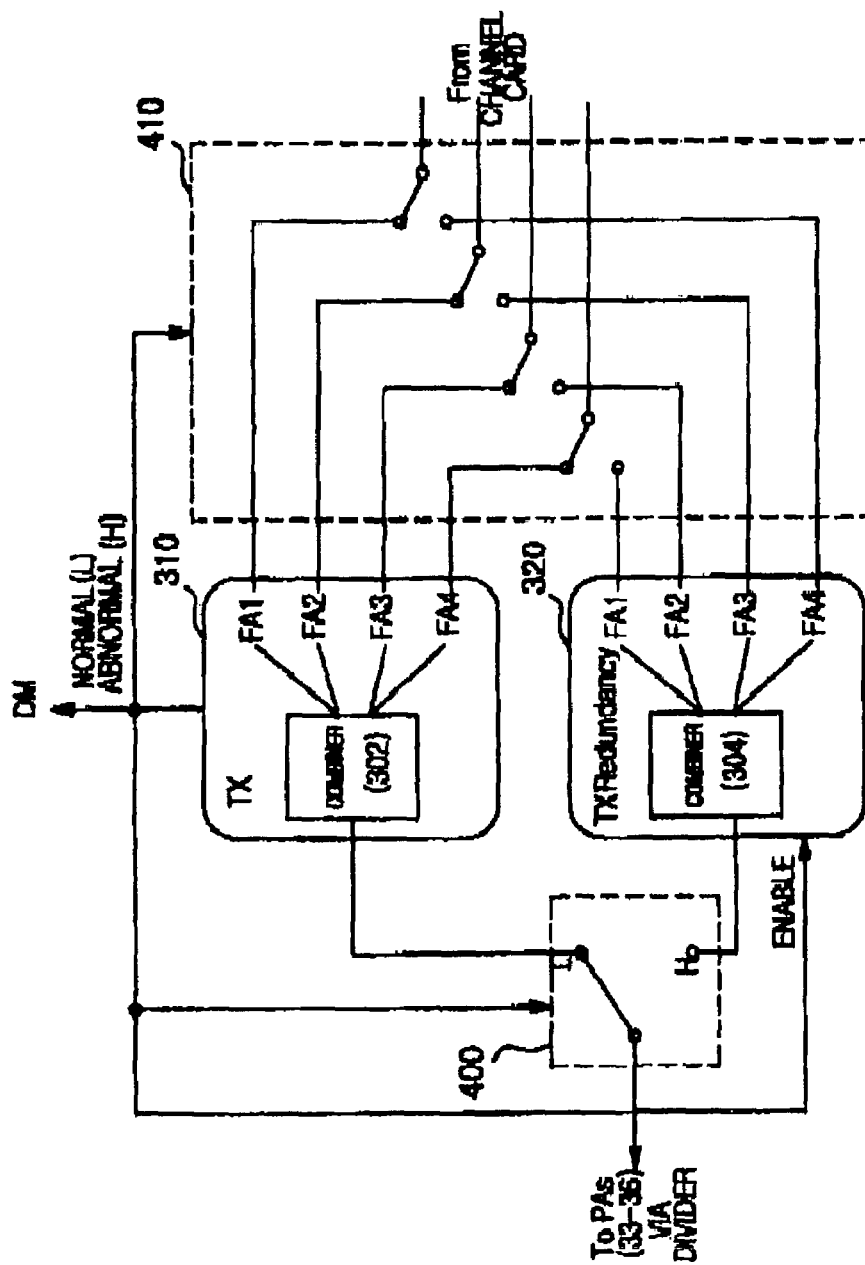
FIG. 6 is a diagram illustrating in more detail the switching control operation on the transmitting paths of the base station system according to the preferred embodiment of the present invention.

FIG. 6 is a diagram illustrating in more detail the switching control operation on the transmitting paths of the base station system according to the preferred embodiment of the present invention. Referring to FIG. 6, a switching section 410 is connected between a channel card (not shown) and the up-converter board 310 and redundant up-converter board 320. The switching section 410 includes SPDT switches, each of which has one input terminal and two output terminals, and the number of which corresponds to the number of FAs. Input terminals of the SPDT switches of the switching section 410 are connected with the channel card, and output terminals of the SPDT switches of the switching section 410 are connected with output terminals of corresponding FAs of the up-converter board 310 and the redundant up-converter board 320. The switching operation of each SPDT switch of the switching section 410 is controlled by DM signals for the up-converter board 310. The redundant up-converter board 320 is controlled by DM signals, which represent whether the up-converter board 310 is normal or not. In other words, the redundant up-converter board 320 is activated in response to a DM signal of "H" level, which represents that the up-converter board 310 is abnormal. The DM signal of "H" level is an enable signal for activating the redundant up-converter board 320.

In response to a DM signal of "L" level, which represents that the up-converter board 310 is normal, an input terminal and a first output terminal of each SPDT switch of the switching section 410 are connected with each other. Then, a transmitting path is formed between the channel card and a corresponding FA of the up-converter board 310. In response to a DM signal of "H" level, which represents that the up-converter board 310 is abnormal, an input terminal and a second output terminal of each SPDT switch of the switching section 410 are connected with each other. Then, a transmitting path is formed between the channel card and a corresponding FA of the up-converter board 320.

The switching section 400 is connected between the up-converter board 310 and the redundant up-converter board 320 and the divider 32 connected to the power amplifiers 33 to 36. The switching section 400 is realized as a DPST switch including two input terminals and one output terminal. A first input terminal of the switching section 400 is connected with an output terminal of the combiner 302 of the up-converter board 310, and a second input terminal of the switching section 400 is connected with an output terminal of the combiner 304 of the up-converter board 320.

The switching operation of the switching section 400 is controlled by DM signals for the up-converter board 310. In response to the DM signal of "L" level, which represents that the up-converter board 310 is normal, a first input terminal L and an output terminal of the switching section 400 are connected with each other. Then, a transmitting path is formed between the up-converter board 310 and the power amplifiers 33 to 36. In response to the DM signal of "H" level, which represents that the up-converter board 310 is abnormal, a second input terminal H and the output terminal of the switching section 400 are connected with each other. Then, a transmitting path is formed between the redundant up-converter board 320 and the power amplifiers 33 to 36.

As described above, on the two receiving paths of the base station, signals received by two receiving antennas transmitted through the band pass filters 11 and 12, and the LNAs 13 and 14, to the 2:3 switching section 100 connected to the three down-converter boards (including one redundant down-converter board) 210, 220, and 230. In each of the down-converter boards 210, 220, and 230, the 1:4 divider divides the received signals according to the FAs.

In the meantime, on the transmitting path of the base station, signals are sent from the two up-converter boards (including one redundant up-converter board) 310 and 320 to the 2:1 switching section 400. In this case, in each of the up-converter boards, the 4:1 combiner combines the transmitted signals for FAs and outputs a combined signal. The combined signal transmitted in the hard-redundancy mode is transmitted through the 1:4 divider 32, and then the divided signals are amplified by the linear amplifiers 33 to 36 of the soft-redundancy mode utilizing load sharing. Then, they are combined by the 4:1 combiner 37, and the combined signal is transmitted through the band pass filter 38 and the antenna. This construction enables the base station to perform a seamless normal operation even when any board in the transmitting and receiving paths is abnormal.

As described above, the base station of the mobile communication system according to the preferred embodiment of the present invention has a simple mechanical construction and provides effective communication service. In the base station according to the present invention, even when one of the boards goes out of order and cuts off the call, thereby having a bad influence on the entire capacity of the system, a redundant board is automatically switched on and operated normally, so that the base station according to the present invention is more efficiently maintained in comparison with the conventional base station.

Figure 1:
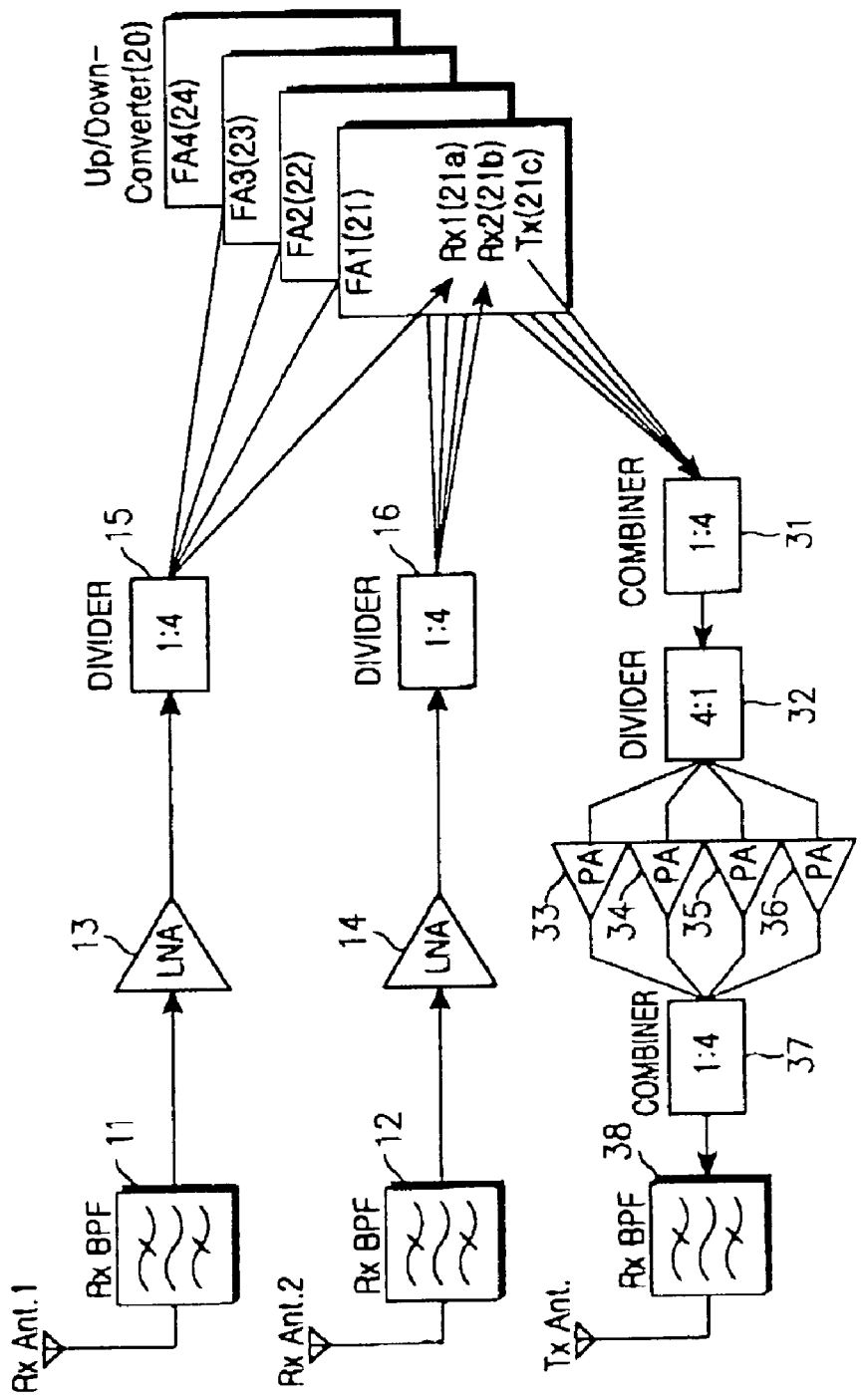
FIG. 1 is a block diagram illustrating a construction of a conventional base station system.

Referring to the prior art illustrated in FIG. 1, the up/down-converter 20 is divided according to FAs without a separate redundant board. Therefore, not only that one FA cannot be used when a board is abnormal, but also every FA has a bad performance even when every other FA operates normally, because two receiving paths and one transmitting path are mixed in each FA. The present invention not only overcomes this problem, but also much simplifies the mechanical construction of the system by installing a divider or combiner in each down- or up-converter board.

While the invention has been shown and described with reference to a certain preferred embodiment thereof, it will be understood by those skilled in the art that various changes in form and details may be made therein. For example, although the above-mentioned preferred embodiment is an example employed in a base station system designed to support multi-sector/multi-FA, the present invention can be employed in a base system supporting one sector/one FA, not multi-sector/multi-FA. That is, the above-described operation according to the present invention can be also applied to a base station system having a down- or up-converter including down- or up-converter boards and a redundant down- or up-converter board, the number of which corresponds to the number of receiving or transmitting paths. Therefore, the scope of the invention should not be limited by the described embodiment, but should be defined by the appended claims and equivalents thereof.

What is claimed is:

1. A signal-receiving system of a base station system of a mobile communication system, the signal-receiving system comprising:
   at least one signal-receiving section;
   a down-converter including at least one down-converter board and at least one redundant down-converter board, wherein one board is selected from among the at least one down-converter board and the at least one redundant down-converter board for downwardly converting a frequency of a signal inputted through the signal-receiving section, the at least one down-converter board corresponding to the signal-receiving section; and
   a switching section connected between the signal-receiving section and the down-converter, the switching section being switched to connect the at least one down-converter board with the signal-receiving section when the at least one down-converter board is normal, and as to connect the at least one redundant down-converter board with the signal-receiving section when the at least one down-converter board is abnormal,
   wherein the at least one down-converter board and the at least one redundant down-converter board each comprise:
   a divider dividing the signal inputted through the signal-receiving section into a plurality of signals, a number of which corresponds to that of predetermined multi-frequency assignments (FAs); and
   a plurality of converters corresponding to the predetermined FAs for downwardly converting outputs of the divider for the corresponding FAs.

2. The signal-receiving system as claimed in claim 1, wherein the signal-receiving system supports multi-sectors.

3. The signal-receiving system as claimed in claim 1, wherein the signal-receiving section comprises:
   a receiving antenna;
   a band pass filter for band pass-filtering a signal received through the receiving antenna; and
   a low noise amplifier for amplifying the signal band pass-filtered by the band pass filter.

4. The signal-receiving system as claimed in claim 1, further comprising at least one switch which is connected with output terminals of the at least one down-converter board and the at least one redundant down-converter board, the at least one switch selectively outputting the signal, the frequency of which has been downwardly converted by said one board selected from among the at least one down-converter board and the at least one redundant down-converter board, according to whether the at least one down-converter board is normal or abnormal.

5. A signal-transmitting system of a base station system of a mobile communication system, the signal-transmitting system comprising:

an up-converter including at least one up-converter board and at least one redundant up-converter board, wherein one board is selected from among the at least one up-converter board and the at least one redundant up-converter board for upwardly converting a frequency of a transmitting signal which is to be transmitted; and a switching section that is switched to supply said transmitting signal to the at least one up-converter board when the at least one up-converter board is normal, and to supply said transmitting signal to the at least one redundant up-converter board when the at least one up-converter board is abnormal, wherein the at least one up-converter board and the at least one redundant up-converter board each comprise:

a plurality of converters corresponding to predetermined FAs for upwardly converting a frequency of said transmitting signal; and a combiner for combining outputs of the converters and outputting a combined signal to the switching section.

6. The signal-transmitting system as claimed in claim 5, further comprising a switch which is switched to be connected with an output terminal of said one board selected from among the at least one up-converter board and the at least one redundant up-converter board, whether the at least one up-converter board is normal or abnormal.

7. The signal-transmitting system as claimed in claim 6, further comprising:

a plurality of power amplifiers, a number of which corresponds to that of the predetermined FAs;

a divider dividing an output of the switch and supplying the divided output to the power amplifiers;

a combiner combining outputs of the power amplifiers and outputting a combined signal;

a band pass filter for band pass-filtering the combined signal from the combiner; and a transmitting antenna for transmitting the combined signal filtered by the band pass filter.

8. The signal-transmitting system as claimed in claim 5, wherein the signal-transmitting system supports multi-sectors.

9. A base station system of a mobile communication system including a signal-receiving unit and a signal-transmitting unit, wherein the signal-receiving unit comprises:

at least one signal-receiving section;

a down-converter including at least one down-converter board and at least one redundant down-converter board, wherein one board is selected from among the at least one down-converter board and the at least one redundant down-converter board for downwardly converting a frequency of a signal inputted through the signal-receiving section, the at least one down-converter board corresponding to the signal-receiving section; and a first switching section connected between the signal-receiving section and the down-converter, the first switching section being switched to connect the at least one down-converter board with the signal-receiving section when the at least one down-converter board is normal, and to connect the at least one redundant down-converter board with the signal-receiving section when the at least one down-converter board is abnormal, and wherein the signal-transmitting unit comprises:

an up-converter including at least one up-converter board and at least one redundant up-converter board, wherein one board is selected from among the at least one up-converter board and the at least one redundant up-converter board for upwardly converting a frequency of a transmitting signal which is to be transmitted; and a second switching section being switched to supply said transmitting signal to the at least one up-converter board when the at least one up-converter board is normal, and to supply said transmitting signal to the at least one redundant up-converter board when the at least one up-converter board is abnormal, wherein the at least one down-converter board and the at least one redundant down-converter board each comprise:

a divider for dividing the signal inputted through the signal-receiving section into a plurality of signals, a number of which corresponds to that of predetermined multi-frequency assignments (FAS); and a plurality of first converters corresponding to the predetermined FAs for downwardly converting outputs of the divider for the corresponding Fas, and wherein the at least one up-converter board and the at least one redundant up-converter board each comprise:

a plurality of second converters corresponding to predetermined FAs for upwardly converting a frequency of said transmitting signal; and a combiner for combining outputs of the second converters and outputting a combined signal to the second switching section.

10. The base station system as claimed in claim 9, wherein the signal-receiving unit supports multi-sectors.

11. The base station system as claimed in claim 9, wherein the signal-receiving section comprises:

a receiving antenna;

a band pass filter for band pass-filtering a signal received through the receiving antenna; and a low noise amplifier for amplifying the signal band pass-filtered by the band pass filter.

12. The base station system as claimed in claim 9, further comprising at least one first switch connected with output terminals of the at least one down-converter board and the at least one redundant down-converter board, the at least one first switch selectively outputting the signal, the frequency of which has been downwardly converted by said one board selected from among the at least one down-converter board and the at least one redundant down-converter board, according to whether the at least one down-converter board is normal or abnormal.

13. The base station system as claimed in claim 9, further comprising a second switch which is switched to be connected with an output terminal of said one board selected from among the at least one up-converter board and the at least one redundant up-converter board, according to whether the at least one up-converter board is normal or abnormal.

* * * * *

UNITED STATES PATENT AND TRADEMARK OFFICE
CERTIFICATE OF CORRECTION

| | |
|---|---|
| PATENT NO. | : 7,069,048 B2 |
| APPLICATION NO. | : 10/241241 |
| DATED | : June 27, 2006 |
| INVENTOR(S) | : Seong-Joon Kweon |

Page 1 of 1

It is certified that error appears in the above-identified patent and that said Letters Patent is hereby corrected as shown below:

Title page, item (75) Inventors:

"Seong-Joon Keon" should be --Seong-Joon Kweon--.

Signed and Sealed this

Twelfth Day of December, 2006

JON W. DUDAS
*Director of the United States Patent and Trademark Office*